(12) United States Patent
Fleming et al.

(10) Patent No.: US 6,768,256 B1
(45) Date of Patent: Jul. 27, 2004

(54) PHOTONIC CRYSTAL LIGHT SOURCE

(75) Inventors: James G. Fleming, Albuquerque, NM (US); Shawn-Yu Lin, Albuquerque, NM (US); James A. Bur, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 61 days.

(21) Appl. No.: 10/301,891

(22) Filed: Nov. 22, 2002

Related U.S. Application Data

(63) Continuation-in-part of application No. 10/114,820, filed on Apr. 3, 2002, now Pat. No. 6,583,350, and a continuation-in-part of application No. 09/904,962, filed on Aug. 27, 2001, now Pat. No. 6,611,085.

(51) Int. Cl.[7] .............................. H01J 1/62; H01J 9/00
(52) U.S. Cl. ....................... 313/501; 313/271; 313/495; 445/24
(58) Field of Search ................................. 313/501, 498, 313/499, 271, 495, 315; 136/253; 431/100; 438/57; 257/432, 431; 445/24, 25, 50, 51

(56) References Cited

U.S. PATENT DOCUMENTS

| 5,998,298 A | 12/1999 | Fleming et al. |
| 6,358,854 B1 | 3/2002 | Fleming et al. |

FOREIGN PATENT DOCUMENTS

| JP | 2000-267585 | 12/1999 |

OTHER PUBLICATIONS

Gee, et al., "Photonically Engineered Incandescent Emitter," patent application No. 09/940,962, filed Aug. 27, 2001.
Gee, et al., Thermophotovoltaic Energy Conversion using Photonic Bandgap Selective Emitters, patent application No. 10/114,820, filed Apr. 3, 2002.
Sigalas, et al., "Metallic photonic band–gap materials," *Phys. Rev. B52* (16), 11744 (1995).
Ozbay, et al., "Defect structures in metallic photonic crystals," *Appl. Phys. Lett. 69* (25), 3797 (1996).
Lin, et al., "A three–dimensional photonic crystal operating at infrared wavelengths," *Nature 394*, 251 (1998).
Lin, et al., "Enhancement and suppression of thermal emission by a three–dimensional photonic crystal," *Phys. Rev. B62*, R2243 (2000).
Lin, et al., "Two– and Three– Dimensional Photonic Crystals Built with VLSI Tools," *MRS Bulletin*, pp. 627–631, Aug. 2001.
Fleming, et al., "All–metallic three–dimensional photonic crystals with a large infrared bandgap," *Nature 417*, 52 (2002).
Pralle, et al., "Photonic crystal enhanced narrow–band infrared emitters," *Appl. Phys. Lett. 81(25)*, 4685 (2002).

*Primary Examiner*—Joseph Williams
(74) *Attorney, Agent, or Firm*—Kevin W. Bieg

(57) ABSTRACT

A light source is provided by a photonic crystal having an enhanced photonic density-of-states over a band of frequencies and wherein at least one of the dielectric materials of the photonic crystal has a complex dielectric constant, thereby producing enhanced light emission at the band of frequencies when the photonic crystal is heated. The dielectric material can be a metal, such as tungsten. The spectral properties of the light source can be easily tuned by modification of the photonic crystal structure and materials. The photonic crystal light source can be heated electrically or other heating means. The light source can further include additional photonic crystals that exhibit enhanced light emission at a different band of frequencies to provide for color mixing. The photonic crystal light source may have applications in optical telecommunications, information displays, energy conversion, sensors, and other optical applications.

54 Claims, 11 Drawing Sheets

PHOTONIC CRYSTAL LIGHT SOURCE

CROSS-REFERENCE TO RELATED APPLICATIONS

This application is a continuation-in-part of U.S. patent application Ser. No. 09/940,962, filed on Aug. 27, 2001 and since issued as U.S. Pat. No. 6,611,085; and U.S. patent application Ser. No. 10/114,820, filed on Apr. 3, 2002 and since issued as U.S. Pat. No. 6,583,350; both of which are incorporated herein by reference.

STATEMENT OF GOVERNMENT INTEREST

This invention was made with Government support under contract No. DE-AC04-94AL85000 awarded by the U.S. Department of Energy to Sandia Corporation. The Government has certain rights in the invention.

FIELD OF THE INVENTION

The present invention relates to light sources and, more particularly, to a light source based on photonic crystal structures.

BACKGROUND OF THE INVENTION

Optics are pervasive in modem life. Optical applications are increasingly found in information technology and telecommunications; health care and the life sciences; optical sensing, lighting and energy; manufacturing; and national defense. Many of these applications require efficient light sources.

Lighting applications require light sources with a broad color spectrum that matches well to the response of the human eye. Both thermal sources (e.g., incandescent lamps) and luminescent sources (e.g., fluorescent lamps) are used to generate broad-band illumination for lighting. However, incandescent lamps are both inefficient and have a relatively short lifetime. The luminous efficacy (radiant flux in the spectral region of interest divided by the total input power) of a 60 W incandescent lamp using a tungsten filament is only about 15 lumens/Watt. By comparison, the theoretical maximum luminous efficacy for high-quality white lighting using a broad spectral source is around 200 lumens/Watt. The luminous efficacy of the incandescent lamp is low because much of the light (around 90%) is emitted by the tungsten filament in the non-visible infrared (wavelengths longer than 760 nm) portion of the optical spectrum. Fluorescent lamps have higher luminous efficacy, but tend to provide harsher lighting with poorer color quality.

About one-fifth of the total U.S. electricity consumption is currently devoted to lighting. Therefore, small increases in efficiency can represent large savings in energy and the cost of artificial lighting. Steady advancements have been made in traditional incandescent, fluorescent, and high-intensity gas discharge lamps, providing improvements in the efficiency and color quality for both existing and new kinds of light sources. For example, new phosphors make the generation of different colors possible, improving the color rendering of fluorescent and discharge radiators. Infrared coatings have provided improvements in the efficiency of incandescent lamps. However, these light sources still suffer from low energy efficiency, poor human visual response, high cost, ease of maintenance, or difficulty in distribution. Therefore, the improvement of existing light sources, the development new kinds of light sources, and high-efficiency distribution systems remain important goals in the lighting industry.

On the other hand, many radiation applications require light sources providing quasimonochromatic light having a high radiant flux in a narrow spectral band. These applications typically necessitate the development of different lamps for specific ranges of wavelengths. High-pressure gas discharge lamps, which emit copious line radiation, are frequently used for such purposes. Incandescent bulbs have also been covered with a filter to narrow the bandwidth and produce colored lamps, but at the expense of a further reduction in their emission efficiency.

A relatively new kind of quasimonochromatic light source is the semiconductor light-emitting diode (LED). LEDs emit radiation over a small spectral band. Therefore, the early developed red LEDs have been primarily used for specialized applications, such as automotive indicator lights, traffic signals, and information displays. Because of recent technical breakthroughs, there has been increased interest in the use of solid-state lighting for general illumination. In particular, recently developed blue and green LEDs can be used to produce "white" light when mixed with the existing high-brightness red and yellow LEDs. Color mixing of single-color LEDs or phosphor excitation with blue or UV LEDs offer the possibilities of improved color rendering and novel ways of using LED light sources. Solid-state lighting based on LEDs may compete with traditional incandescent and fluorescent light bulbs, if manufacturing costs can be reduced and brightness and efficiency can be increased.

However, for many optical applications, there remains a need for an efficient light source having an output that can be easily tuned over a broad spectral range. The present invention provides a low-cost, efficient narrow-band light source based on photonic crystal structures. The spectral properties of the light source can be easily tuned by modification of the photonic crystal structure and materials. These photonic crystal light sources may have applications in optical telecommunications, information displays, energy conversion, sensors, etc. As with LEDs, a broad-band light source for lighting applications can be realized by color mixing of single-color photonic crystal emitters or by phosphor excitation.

SUMMARY OF THE INVENTION

The present invention is directed to a light source, comprising a photonic crystal having at least two dielectric materials that provide a periodic variation in the dielectric constant of the photonic crystal such that the photonic crystal exhibits an enhanced photonic density-of-states over a band of frequencies, and wherein at least one of the dielectric materials has a complex dielectric constant to provide enhanced light emission at the band of frequencies when the photonic crystal is heated. The absolute value of the real part is preferably greater than about four times the imaginary part of the complex dielectric constant of the at least one of the dielectric materials at the band of frequencies. The absolute value of the real part of the complex dielectric constant is preferably greater than 10 and more preferably greater than 100. The imaginary part of the complex dielectric constant is preferably greater than 1 and more preferably greater than 5. The enhanced photonic density-of-states can occur within the allowed band, and preferably at the band edge of a photonic band gap of the photonic crystal. Alternatively, the enhanced photonic density-of-states can occur within the photonic band gap for a photonic crystal having a cavity or cavity-like defect. The light source can further comprise at least one additional photonic crystal having an enhanced photonic density-of-states at a different band of frequencies to provide for color mixing of the emitted light.

The present invention further includes a method for producing light emission, comprising heating the photonic crystal to provide enhanced light emission at the band of frequencies. The heating can comprise resistive heating by application of a bias voltage to the photonic crystal or other heating means. The photonic crystal can be thermally isolated from its surroundings to prevent thermal quenching of the optical emission.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 2 illustrates a layer-stacking fabrication sequence for a four-layer Lincoln-Log type tungsten photonic crystal.

FIG. 4 shows the measured optical spectra of a five-layer Lincoln-Log type tungsten photonic crystal.

FIG. 9 shows semi-logarithmic plots of the emission peak amplitudes as a function of inverse temperature for the tungsten photonic crystal.

DETAILED DESCRIPTION OF THE INVENTION

Figure 1:
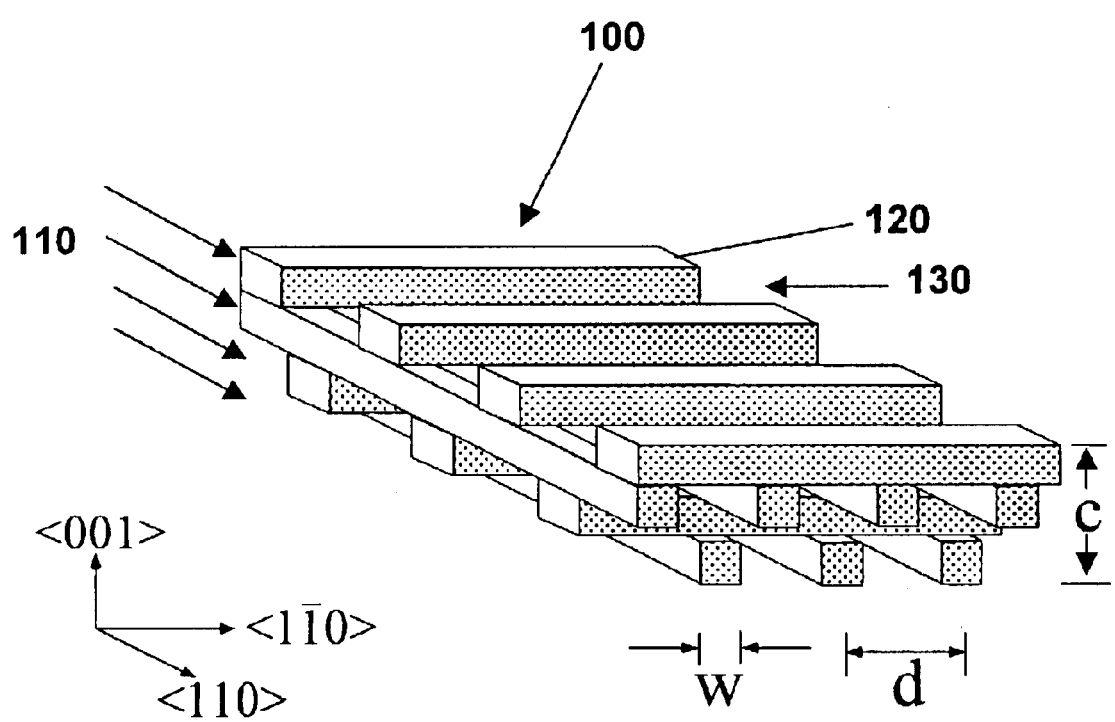
FIG. 1 shows a schematic illustration of a three-dimensional (3D) "Lincoln-Log" type photonic crystal structure.

The present invention comprises a photonic crystal that displays enhanced light emission at visible and infrared wavelengths. This enhanced emission can enable an efficient light source when heated to a temperature above ambient, for example, with an electric current. By modifying the structural dimensions and materials of the photonic crystal lattice, the emission color can be easily varied. Therefore, color mixing and on-chip integration of multiple narrow-band photonic crystal light sources is readily achievable. Furthermore, the brightness of each photonic crystal light source can be independently varied by selective voltage biasing, thereby enabling continuously variable color tuning.

Photonic crystals comprise materials having a periodic variation in dielectric constant on the order of the wavelength of light. The periodic variation changes the allowed optical modes in the medium, leading to many varied and useful properties. Some photonic crystals can completely eliminate optical modes in all directions for a specific band of wavelengths. These structures are said to exhibit a full three-dimensional (3D) photonic band gap. No optical absorption or emission is allowed within the full 3D photonic band gap due to an absence of photonic density-of-states in this regime. However, the photonic density-of-states can be greatly enhanced and enhanced light-matter interaction can occur in other regimes. As used herein, an enhanced photonic density-of-states refers to an increased density-of-states over that of a uniform dielectric medium having the same effective dielectric constant as the photonic crystal. For example, an enhanced photonic density-of-states and, therefore, enhanced absorption and emission can be achieved at the photonic band edge in certain photonic crystals having the proper crystal symmetry, lattice period, and dielectric contrast, and wherein at least one the dielectric materials has a complex dielectric constant. Indeed, an enhanced photonic density-of-states can occur elsewhere within the allowed band, but typically with a weaker enhancement effect than at the photonic band edge.

An enhanced photonic density-of-states over a frequency band can also be achieved with a variety of other photonic crystal structures. For example, the photonic crystal can have a cavity defect. The defect can be either additive (e.g., the addition of the high dielectric material where it would not normally occur in the photonic crystal structure) or subtractive (the removal of normally occurring dielectric material). A cavity-like defect can also be created by changing a lattice parameter or material in a region of the photonic crystal. Such defects are known to provide enhanced resonant emission within the photonic band gap of the photonic crystal due to an increase in the allowed states in the density-of-states within the photonic band gap. The emission wavelength and the cavity quality factor of the defect can be tailored by varying the geometry and index contrast of the periodic dielectric structure. See e.g., Ozbay et al., "Defect structures in metallic photonic crystals," *APPl. Phys. Lett.* 69, 3797 (1996) and Lin et al., "Two- and Three-Dimensional Photonic Crystals Built with VLSI Tools," *MRS Bulletin*, pp. 627–631, August 2001, which are incorporated herein by reference.

To provide for enhanced light emission, at least one of the dielectric materials of the photonic crystal structure is both dispersive and absorptive, with a complex dielectric constant. A large dielectric contrast is required to obtain a full 3D photonic band gap, preferred to obtain an enhanced photonic density-of-states at the band edge of the photonic band gap of the photonic crystal. Accordingly, for enhanced light emission, the real part $\in_r(\omega)$ of the dielectric constant of the emitter material should preferably be much larger than the dielectric constant of the other dielectric material(s).

Assuming that the other dielectric material is air, the absolute value of the real part $|\epsilon_r(\omega)|$ of the dielectric constant of the emitter material is preferably greater than 10 and more preferably greater than 100 at the visible or infrared emission frequency. Furthermore, to obtain the strong absorption band providing the enhanced light emission at the photonic band edge, the emitter material should preferably be somewhat lossy. Accordingly, the imaginary part $\epsilon_i(\omega)$ of the dielectric constant of the emitter material is preferably greater than 1 and more preferably greater than 5. In general, it is preferable that $|\epsilon_r(\omega)|>4\epsilon_i(\omega)$ to obtain the enhanced photonic density-of-states and the strong interaction strength necessary for enhanced absorption and emission. The combination of high $\epsilon_r(\omega)$ and moderate $\epsilon_i(\omega)$ indicates metals as a preferred emitter material.

Photonic Crystal Structures

Various types of photonic crystal structures that exhibit a 2D or 3D photonic band gap and are known to those in the art are suitable for the present invention. These 2D and 3D photonic crystal structures can be fabricated by various methods known to those skilled in the art, including microfabrication and self-assembly processing methods. Some examples of photonic crystal structures and the fabrication thereof are disclosed in U.S. Pat. No. 6,358,854 to Fleming et al., which is incorporated herein by reference.

A common type of photonic crystal exhibiting a 3D photonic band gap that will be used as an illustrative example in the present disclosure is the Lincoln-Log type of photonic crystal structure 100 shown schematically in FIG. 1. The 3D Lincoln-Log type structure comprises alternating layers 110, each layer 110 further comprising an evenly spaced row of parallel "logs" or rods 120 of material with a first dielectric constant. The rods have a width of w. The spaces between the rods 120 are filled by a material 130 having a second dielectric constant. For simplicity as well as for high dielectric contrast, the second material 130 is often air. For a four-layer photonic crystal 100, the one-dimensional rods 120 have a stacking sequence that repeats itself every four layers with a lattice period, or unit cell, of c. Within each layer 110, the axes of the rods 120 are parallel to each other with a pitch of d. Alternate layers 110 are rotated by 90 degrees relative to the previous layer. Between each layer 110, the rods 120 are shifted relative to each other by 0.5 d. The resulting structure has a face-centered-tetragonal lattice symmetry of which the diamond structure is a subset. For the special case of c/d=1.414, the crystal 100 can be derived from a face-centered-cubic unit cell with a basis of two rods.

The vertical topology of the 3D photonic crystal structure can be built by repetitive deposition and etching of multiple dielectric films in a layer-by-layer method using integrated circuit technologies. One layer-stacking method for fabricating the photonic crystal is to build up the structure directly with a structural material, as has been done to fabricate a silicon photonic crystal. See Lin et al., "Enhancement and suppression of thermal emission by a three-dimensional photonic crystal," Phys. Rev. B62, R2243 (2000) and Lin et al., "A three-dimensional photonic crystal operating at infrared wavelengths," Nature 394, 251 (1998), which are incorporated herein by reference. Alternatively, the fabrication process can comprise forming a lattice structure mold for the structural material in a sacrificial material, selective deposition of the structural material into the lattice structure mold, and finally removing the sacrificial material from the backfilled mold to leave a photonic crystal of the structural material in air. This latter method may have advantages if the dielectric materials can build up large residual stresses during a direct layer-by-layer fabrication process or when the two dielectric materials have different thermal expansion coefficients. Alternatively, the sacrificial material need not be removed if residual stresses or thermal mismatches are not problematic, providing a photonic crystal of two different solid dielectric materials. This fabrication process can be used to form photonic crystals of a wide variety of structural materials that can be deposited by a conformal process, including metals, metal alloys, and semiconductors.

For illustrative purposes, described below and illustrated in FIGS. 2A–2I is a layer-stacking fabrication sequence for a 3D Lincoln-Log tungsten photonic crystal, suitable for the light source of the present invention. Tungsten, like many metals, provides the large dielectric contrast and moderate imaginary dielectric constant preferred for enhanced emission. At a 5 μm wavelength, $|\epsilon_r(\omega)| \sim 500$ and $\epsilon_i(\omega) \sim 120$ for tungsten at room temperature. In addition, tungsten can be easily deposited and patterned using commonly available tools in the microelectronics industry to achieve such a photonic crystal light source. Photonic crystals of other metals and non-metals having a complex dielectric constant are also suitable for the photonic crystal light source of the present invention.

A lattice structure mold can be formed by sequential deposition of a cavity-forming structural material, such as polysilicon, in alternating patterned layers of a sacrificial mold material, such as silica ($SiO_2$). The basic layer-by-layer polysilicon in silica fabrication sequence is described in the aforementioned references by Lin et al. The fabrication of a tungsten photonic crystal by the layer-stacking method is described by Fleming et al., Nature 417, 52 (2002), which is incorporated herein by reference. This layer-by-layer fabrication method enables layered material composition with precise thickness, planarity, and alignment control. For illustration, fabrication of a tungsten photonic crystal having a rod-to-rod spacing of d=4.2 μm, a rod width of w=1.2 μm, and a layer thickness of h=1.6 μm is described hereinafter.

Figure 2A:
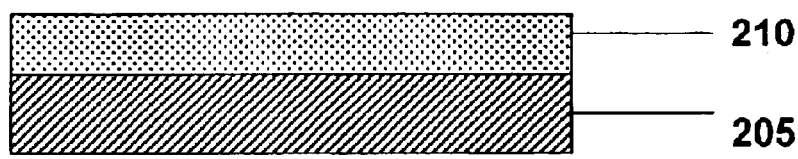
FIG. 2A shows a sacrificial layer deposited on a silicon substrate.

In FIG. 2A, a first layer 210 comprised of the sacrificial mold material, e.g., silica, is deposited onto a silicon substrate 205. The thickness of silica layer 210 can be approximately equal to the desired thickness of the first structured layer 240 of the photonic lattice, whose thickness is typically in the range 0.02–10 μm, depending on the band-edge wavelength of interest. For the 3D tungsten photonic crystal described herein, the thickness of the structured layer 240 can be 1.6 μm, and the initial thickness of silica layer 210 can be approximately 2.0 μm.

Figure 2B:
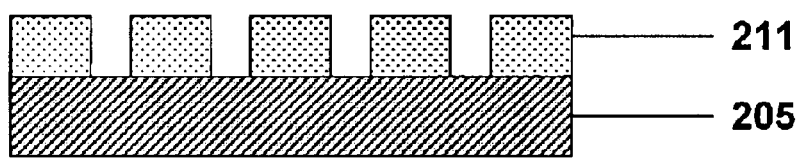
FIG. 2B shows the sacrificial layer after patterned etching.

FIG. 2B shows the first silica layer 210 patterned to form a plurality of evenly spaced and parallel spacer bars 211 with approximately rectangular cross-section. Such patterning can be accomplished using a photolithographic etch mask (not shown) over silica layer 210 with a plurality of openings in the etch mask at the locations where the material in layer 210 between the spacer bars 211 is to be removed. An anisotropic etching process can then be used (e.g., reactive ion etching directed normal to the surface), resulting in silica bars 211 having approximately rectangular cross-section. The etching step is preferably performed to etch completely down through layer 210 to the substrate 205. The etch mask can then be stripped, resulting in the structure shown in FIG. 2B. In the present example, the pitch between adjacent spacer bars 211 can be 4.2 μm and the width of the spacer bars can be 3.0 μm.

Figure 2C:
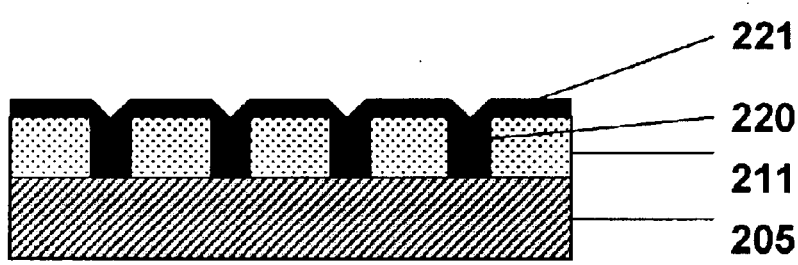
FIG. 2C shows a polysilicon layer deposited in the void regions of the patterned sacrificial layer.

In FIG. 2C, polysilicon 220 can be deposited by chemical vapor deposition to fill in the regions between the silica spacer bars 211. Again, the polysilicon thickness can be greater than the desired final thickness of the first structured layer 240. Depositing the polysilicon 220 generally leads to a complex and dimpled surface 221. Such a rough and uneven surface could result in a poor quality photonic crystal, due to scattering and uncontrolled reflections at the growth surface. Therefore, chemical-mechanical-polishing (CMP) of the growth surface is performed to planarize the growth surface prior to deposition of subsequent structural layers. CMP of the general type used in the present invention is disclosed in U.S. Pat. No. 5,998,298 to Fleming et al., which is incorporated herein by reference.

Figure 2D:
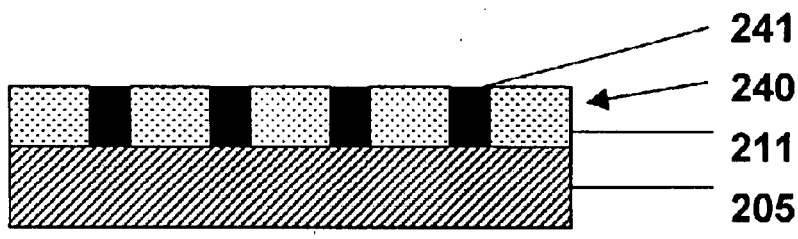
FIG. 2D shows a first structured layer after planarization of the polysilicon layer.

As shown in FIG. 2D, a first structured layer 240 comprising a planar pattern of silica spacer bars 211 and polysilicon rods 241 is thereby produced. The polysilicon rods 241 are elongate, roughly rectangular in cross section, and can be 1.2 μm wide and 1.6 μm thick.

Figure 2E:
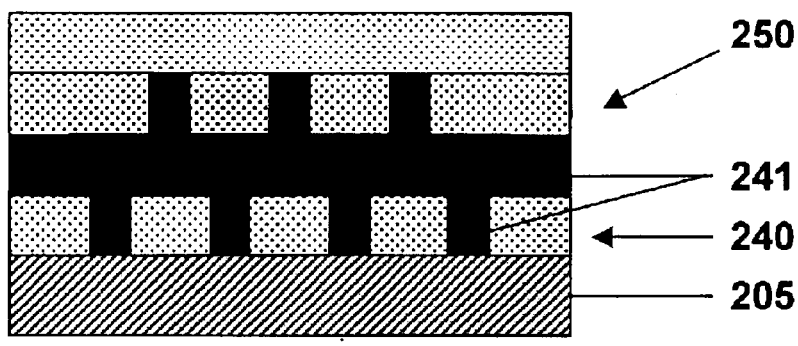
FIG. 2E shows the build-up of multiple structured layers.

As shown in FIG. 2E, repeating the same basic set of growth and processing steps, multiple structured layers 240 can be grown on top of the substrate 205 to form the desired photonic lattice structure 250 with polysilicon. To form the Lincoln-Log structure, the orientation of the polysilicon rods 241 is rotated 90° between each structured layer 240, and between every other layer the rods 241 are shifted relative to each other by half of the pitch d. The structure 250 thereby has a face-centered-tetragonal lattice symmetry.

Figure 2F:
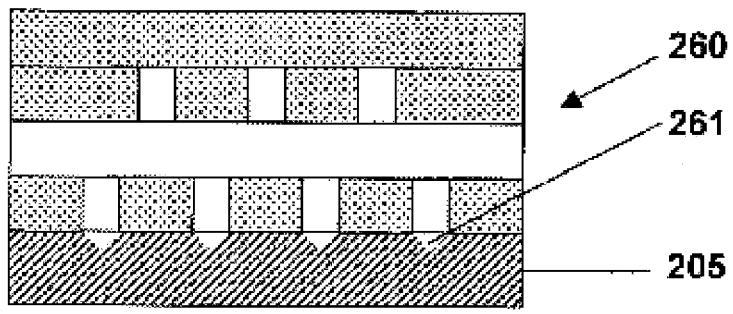
FIG. 2F shows a lattice structure mold formed by removal of the polysilicon.

As shown in FIG. 2F, the polysilicon rods 241 can then be removed to form the lattice structure mold 260. The polysilicon rods 241 can be removed using a 6M, 85° C. KOH etch, which has a selectivity of ~100:1 (Si to $SiO_2$). Overetch during the KOH process, which is desirable to ensure the removal of all the polysilicon 241, can result in the formation of a "V" structure 261 on the bottom of the layer 240 contacting the silicon substrate 205. This is due to etching of the underlying silicon substrate 205 and is dependent on the substrate crystallographic orientation. If the rods 241 are oriented along the <110> direction, the KOH etch effectively stops when the etch-front encounters the slow etching (111) planes of the silicon substrate 205, thereby forming the "V" groove 261.

Figure 2G:
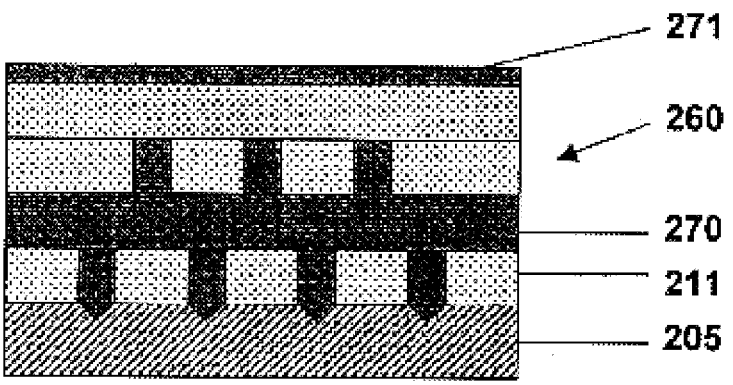
FIG. 2G shows the lattice structure mold backfilled with a structural material (e.g., CVD tungsten).

As shown in FIG. 2G, the lattice structure mold 260 can be backfilled with a structural material. A variety of deposition processes, such as chemical vapor deposition (CVD), electroplating, or infiltration with spin-on glasses or nanoparticles, can be used for the backfilling of the mold 260, so long as the sacrificial material (e.g., silica) can later be selectively removed from the backfilled structural material. For example, III–V compound semiconductors, II–VI materials, single and mixed oxides, nitrides, oxynitrides, metals, and metal alloys can be deposited by CVD. A precursor conducting coating can be applied to the lattice structure mold 260 to facilitate the electroplating of a wide variety of metals from a solution to backfill the mold 260. Typical electroplated metals include copper, nickel, gold, and silver.

The lattice structure mold 260 can be backfilled with tungsten via CVD to form tungsten rods 270 embedded in the silica mold material 211. A precursor 50 nm thick TiN adhesion layer (not shown) can be deposited on the mold 260 by reactive ion sputtering, since the blanket CVD tungsten film does not adhere well to silicon dioxide. Tungsten can be deposited at high pressure (e.g., 90 Torr) from $WF_6$ and $H_2$. The chemical vapor deposition of tungsten results in films of is very high purity.

Figure 2H:
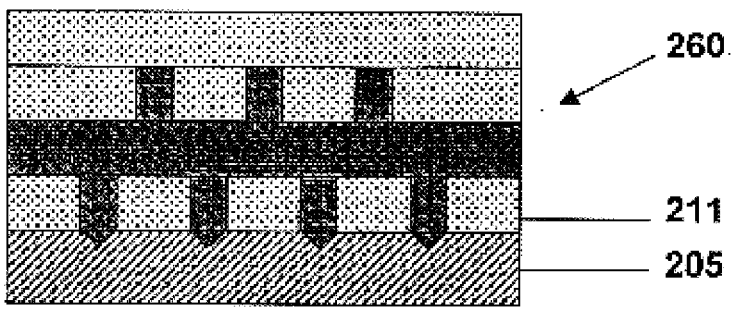
FIG. 2H shows the backfilled mold after planarization of the top surface.

Backfilling of the mold 260 with CVD tungsten 270 can result in a rough and uneven tungsten growth surface 271 on the top surface of the mold 260. As shown in FIG. 2H the top surface of the backfilled mold 260 can planarized by CMP to remove the excess tungsten.

Figure 2I:
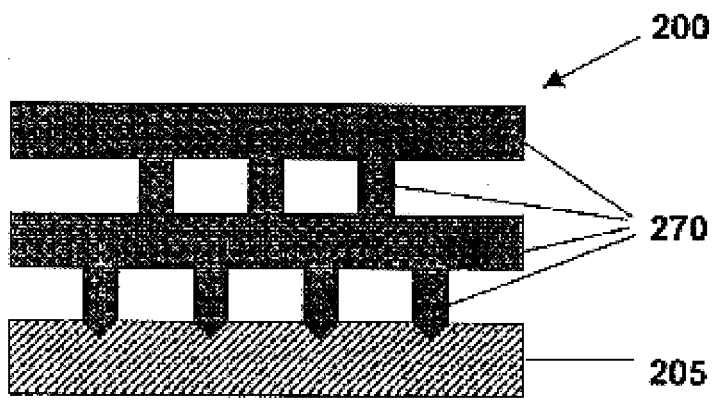
FIG. 2I shows the photonic crystal after removal of the sacrificial material.

Finally, as shown in FIG. 2I, the silica spacer bars 211 can be removed from the tungsten-backfilled and planarized lattice structure mold 260 by selective etching with a 1:1 HF-based solution to provide the photonic crystal 200. If desired, the silicon substrate 205 can be removed by etching in KOH.

Figure 3:
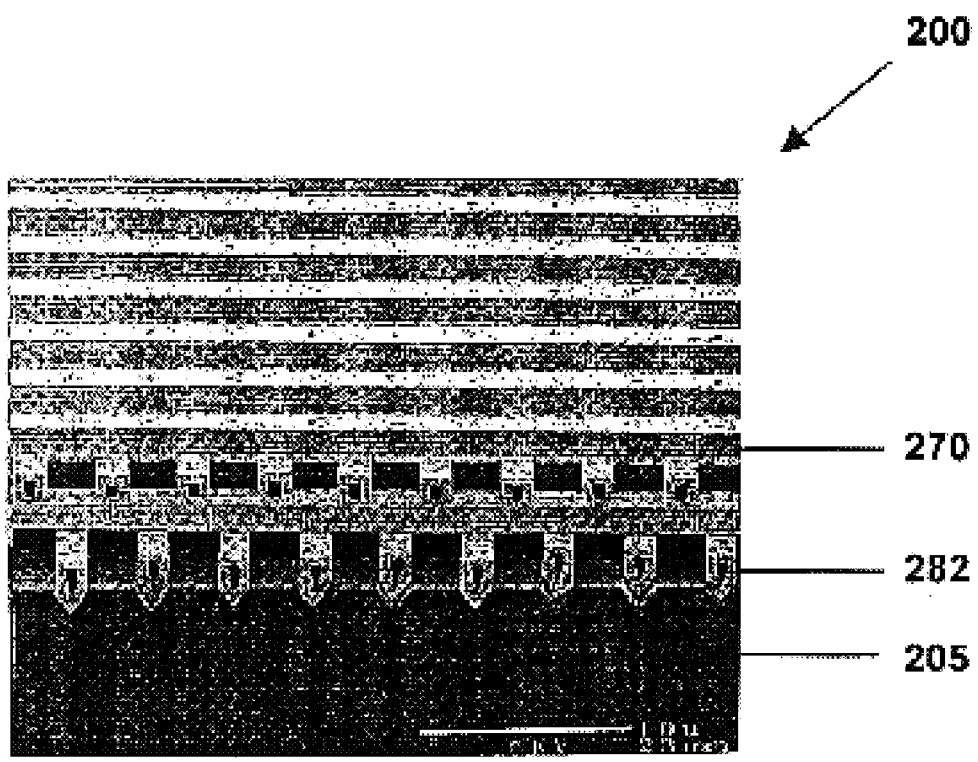
FIG. 3 shows a scanning electron micrograph cross-sectional view of the four-layer Lincoln-Log type tungsten photonic crystal.

In FIG. 3 is shown a scanning electron micrograph of the four-layer tungsten photonic crystal 200 comprising the stacked tungsten rods 270 on the silicon substrate 205. The tungsten photonic crystal 200 has a stacking sequence that repeats itself every four layers, and has a face-center-tetragonal lattice symmetry. For the tungsten photonic crystal shown, the tungsten rod 270 width is 1.2 μm, rod-to-rod spacing is 4.2 μm, and the effective filling fraction of the high index tungsten is 28%. The stacking is such that every four layers constitute a unit cell. A keyhole 282 may be formed in the center of the more deeply embedded lines of the tungsten rods 270, since the step coverage of the CVD tungsten deposition process is not 100%. However, this keyhole 282 is not detrimental to the optical properties of the tungsten photonic crystal 200, since the film thickness is far greater than the skin depth of tungsten for infrared electromagnetic radiation.

The tungsten lattice structure 200 can be separated from the silicon substrate 205, leaving a freestanding 3D tungsten photonic crystal thin film (e.g., 4–5 μm thickness) comprising the stacked tungsten rods 270. The thin film retains sufficient structural integrity to be handled readily, due to the interconnectivity of the tungsten rods 270. Furthermore, the thin film can be heated to high temperatures (e.g., 1500° K.) without noticeable structural degradation.

A cavity defect can be easily introduced into the 3D Lincoln-Log photonic crystal by modification of the width or thickness of an individual rod or a layer of rods. For example, a subtractive defect can be introduced by removal of a rod in the crystal structure. Alternatively, an additive defect can be introduced by increasing the width of a rod. Finally, a cavity-like defect can be introduced by replacing one of the dielectric materials with another dielectric material in a layer or region of the photonic crystal.

This fabrication process can be extended to create almost any interconnected photonic crystal having enhanced emission at visible or infrared wavelengths. Current state-of-the-art silicon integrated circuit processing tools are capable of shrinking the minimum feature sizes to those required for photonic crystal structures that have photonic band gaps in the near infrared and have enhanced light emission in the visible (i.e., at emission wavelengths of 0.4–0.76 μm). For example, current commercially available optical steppers can produce feature size of 130–180 nm over a 12-inch silicon wafer, with projected features sizes of less than 100 nm by year 2003. Direct electron beam write lithography can produce feature sizes of less than 100 nm, but at higher cost.

Optical Properties of the Tungsten Photonic Crystal

The reflection spectra of the 3D tungsten photonic crystal fabricated according to the above process were characterized using a Fourier-Transform Infrared (FTIR) spectrometer for wavelengths ranging from λ=2 to 20 μm. Reflectance from a silver mirror (R>98% at infrared wavelengths) was used as a reflectance reference. The absorption spectra were measured using a photo-acoustic technique. A carbon black absorber, having an absorptance of 0.99 at infrared wavelengths, was used as the absorptance reference. See McClelland et al., "A practical guide to FTIR photoacoustic spectroscopy," Chapter 5 in Practical Sampling Techniques for Infrared Analysis, P. B. Coleman, ed., CRC Press, Boca Raton, Fla. (1993).

Figure 4A:
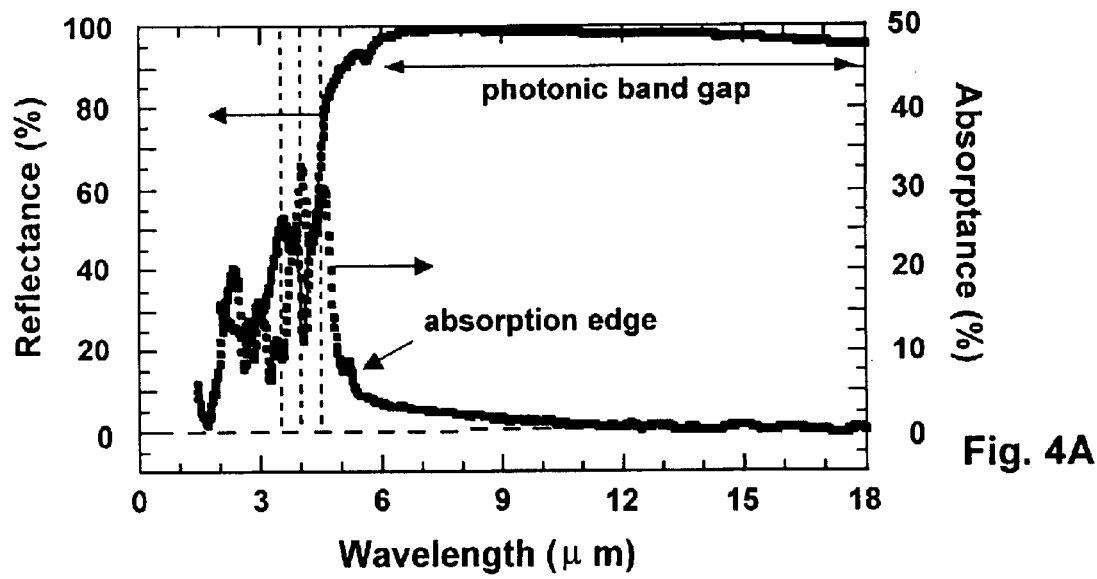
FIG. 4A shows the measured reflection and absorption spectra of the tungsten photonic crystal.

In FIG. 4A are shown the measured reflection spectrum and absorption spectrum of a five-layer tungsten photonic crystal having a rod width of 0.85 μm, rod-to-rod spacing of 2.8 μm, and rod height of 1.2 μm, providing a filling fraction of the tungsten material of about 30%. For these measurements, light was propagated along the <001> direction of the tungsten photonic crystal and was unpolarized.

The reflection spectrum exhibits oscillations at 2<λ<4 μm (the allowed band), raises sharply at λ~4–5 μm (the band edge) and finally reaches a high reflectance of 90% for λ>7 μm (the band gap). Absorptance is low (<2%) in the band gap regime. Because absorption is suppressed in the band gap, light is not allowed to penetrate and interact with the photonic crystal structure in this regime. Such a 3D photonic band gap is a complete band gap wherein the tungsten photonic crystal is capable of blocking light fully from all solid angles and for all polarizations. The photonic density-of-states vanishes in the band gap regime.

The absorption spectrum of the tungsten photonic crystal exhibits three strong absorption peaks near the band edge, at about λ~3.5, 4, and 4.5 μm. The peak absorptance is greater than 30% in the band-edge absorption peaks, which is large compared to the absorptance measured for a uniform tungsten film at these wavelengths (i.e., 0.5–1%). The multiple oscillations at λ<5 μm are attributed to photonic density-of-states oscillations in the photonic allowed band. At the band edge, the photonic density-of-states of the photonic crystal is greatly increased and the group velocity of the light is reduced to near zero, providing for enhanced light-matter interaction.

The origin of the absorption-rate enhancement at the band edge has been investigated by theoretically computing the reflectance and absorptance using a Transfer Matrix method that can treat photonic crystal materials having a complex dielectric function. Calculations were performed for Lincoln-Log type photonic crystal structures having a variety of lattice parameters. These calculations indicate that the absorption is preferentially enhanced and always occurs at the photonic band edge, that the peak absorption amplitude depends on the number of layers of the photonic crystal structure, and that the band-edge absorption originates from the intrinsic tungsten absorption.

Figure 5:
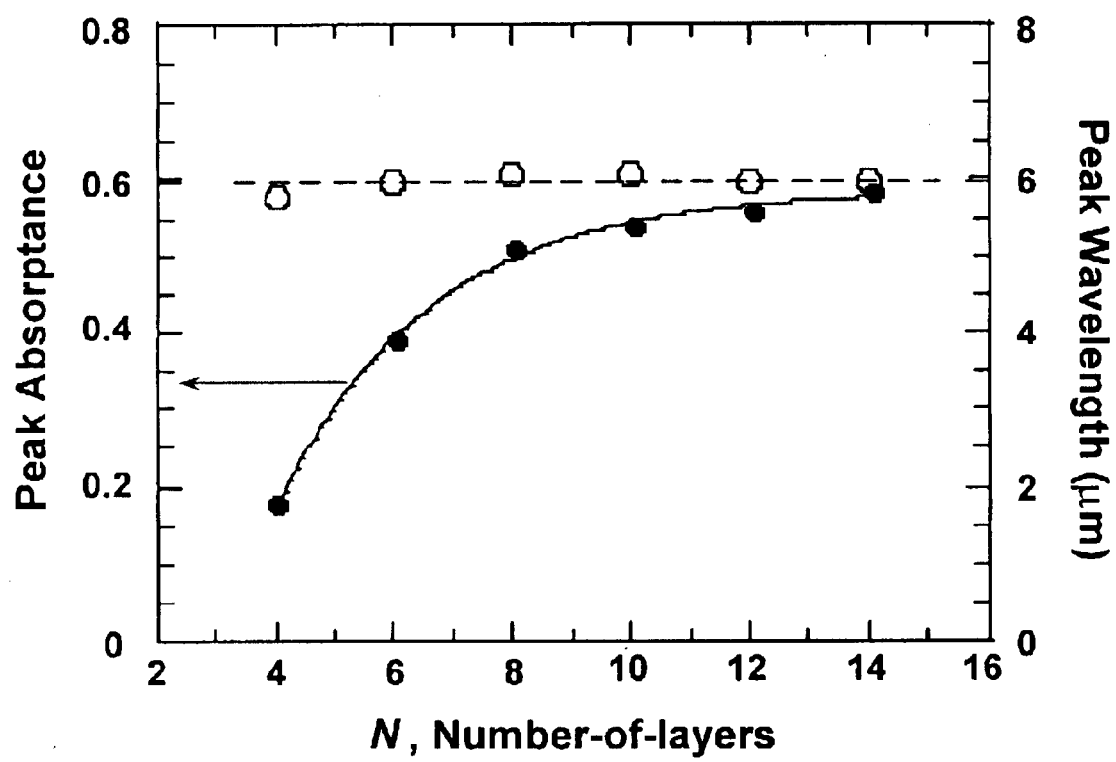
FIG. 5 shows the measured and computed peak absorption amplitude and peak location as a function of the number-of-layers of a tungsten photonic crystal.

FIG. 5 shows the measured and computed peak absorption amplitudes and peak locations as a function of the number of layers, N, for a tungsten photonic crystal having a rod width of 1.2 μm, rod-to-rod spacing is 4.2 μm, and rod height of 1.5 μm. This tungsten photonic crystal has a band edge at about λ~6 μm. The peak absorptance wavelength (open circles) remains nearly unchanged for all Ns. The measured (solid circles) and computed (solid line) peak absorption amplitudes have an exponential-like asymptotic dependence on the number of layers of the photonic crystal structure. The peak absorptance is 18% for one unit cell (N=4) and saturates at about 60% for N>12. The deduced absorption length (1/α, where α is the attenuation constant of the light in the photonic crystal structure) is 3.8 μm at λ~6 μm. In contrast, metallic absorption depends on the metallic skin depth of the metallic surface layer. Therefore, the absorption length for the photonic crystal is much longer than the skin-depth (~20 nm) of tungsten at the same wavelength. The layer-dependence indicates that the electromagnetically excited Bloch-wave can mold its way through the entire photonic-crystal structure, leading to much longer light-matter interaction length. Thus, the layer-dependence of the absorption amplitude is attributed to the extended nature of the Bloch-waves.

The peak absorption originates from the intrinsic tungsten absorption, or the imaginary part of the dielectric constant, $\in_i(\omega)$. Using the intrinsic tungsten absorption, the peak absorption computed for the tungsten photonic crystal agrees well with the observed absorption. The measured absorption for the 3D photonic crystal is therefore an effective absorption that is enhanced from tungsten's intrinsic absorption value. This is because the dipole transition matrix element that leads to $\in_i(\omega)$ must be finite for any enhanced absorption to occur. Conversely, for a perfect conductor ($\in_i=0$), the intrinsic absorption is zero and the enhanced absorption is zero, even at the band edge. Therefore, the absorption enhancement has not been observed in a 3D silicon photonic crystal, because silicon is a low-loss dielectric material ($\in_i<3\times10^{-3}$) in this wavelength range. See S. Y. Lin et al., Nature 394, 251 (1998).

Thus, the metallic absorption rate is suppressed in the photonic band-gap regime and strongly enhanced at the photonic band edge. The absorption enhancement is attributed to an enhanced photonic density-of-states at the photonic band edge and the intrinsic metallic absorption. The absorption enhancement observed in 3D photonic crystals therefore requires that at least one of the dielectric materials has a complex dielectric constant with a finite imaginary part. This absorption enhancement can be exploited to achieve enhanced light emission in a narrow band at the band edge or at other enhanced photonic density-of-states regimes within the photonic crystal.

To achieve enhanced light emission at the band edge, the metallic photonic crystal can be heated to an elevated temperature. For example, the photonic crystal can be heated electrically, by a combustion heat supply, with a solar absorber, radiation absorber, or other suitable source of heat. Preferably, the photonic crystal can be heated electrically by mounting the photonic crystal on an electrically insulating substrate. To avoid quenching of the enhanced emission, the photonic crystal is preferably thermally isolated from its surroundings. Therefore, the photonic crystal can be mounted on a substrate having low thermal conductivity and low heat capacity. Furthermore, the photonic crystal can be placed in a vacuum or in a low pressure, low conductivity gas enclosure to minimize thermal convection. More preferably, the photonic crystal thin film can be suspended between electrical contacts in a vacuum environment to provide both thermal and electrical isolation.

Figure 6:
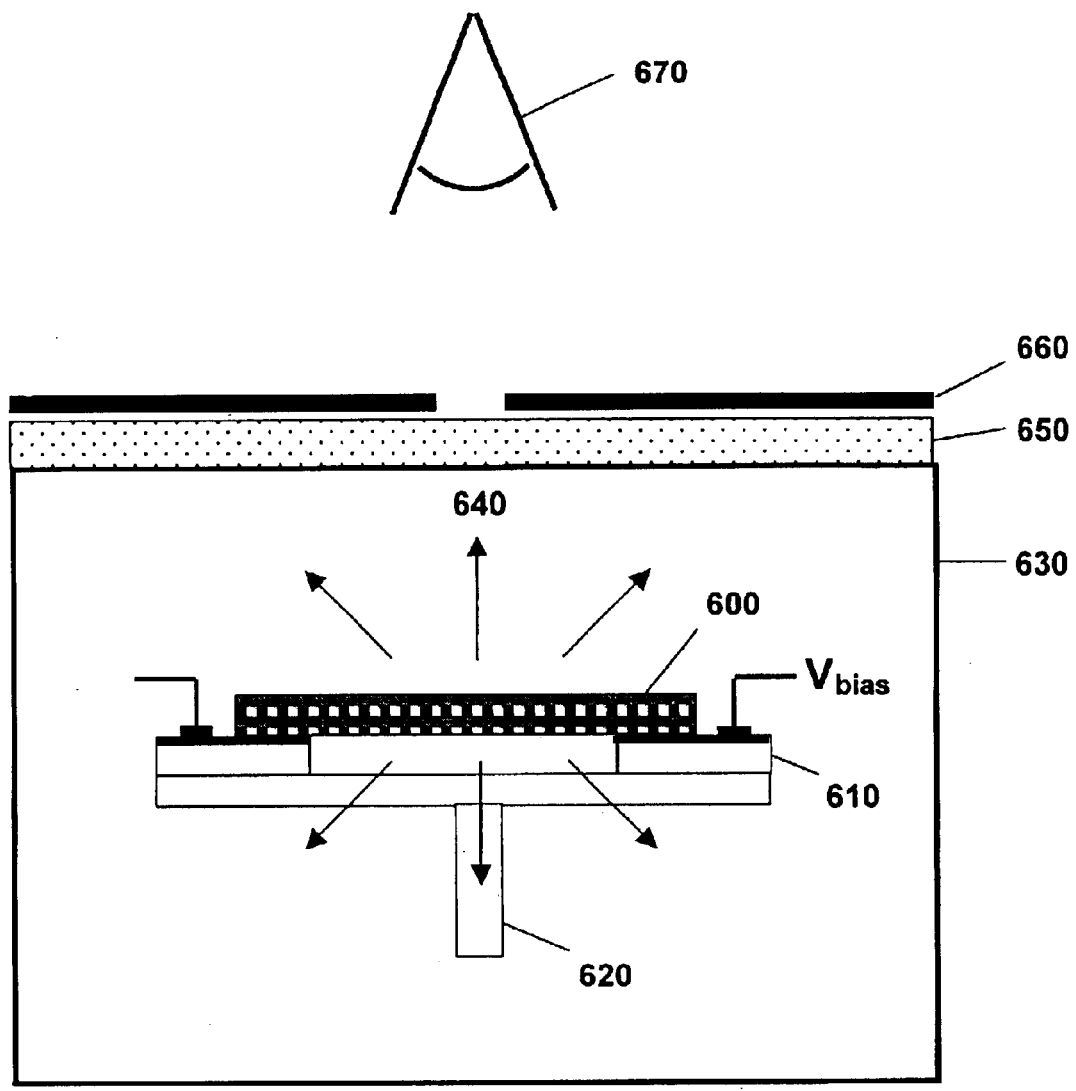
FIG. 6 shows a sample geometry for thermally and electrically isolating a tungsten photonic crystal thin film light source from its surroundings.

In FIG. 6 is shown a sample geometry that was used to observe the emission from a heated thin film 600 of the 3D tungsten photonic crystal 200. The thin film sample 600 was electrically and thermally isolated from the surroundings. The CVD tungsten had a finite resistivity of about ρ=10.5 micro-Ohm-cm at room temperature. Therefore, the tungsten photonic crystal can be conveniently resistively heated by applying a bias voltage $V_{bias}$ across the thin film 600. The sample was mounted on a partially gold-coated quartz plate 610 to provide for end-support and electrical contact to the thin film 600. The low-emissivity quartz plate 610 was attached to an insulating post 620 that was mounted to a copper plate (not shown). To further minimize heat loss, the sample 600 was placed in an evacuated chamber 630 (i.e., at a pressure of about 10 milliTorr). The emitted light 640 from the top surface of the electrically heated sample 600 was observed though an infrared optical window 650, an aperture 660, and a long wavelength ZeSe lens by an FTIR spectrometer 670 equipped with an MCT photodetector. The emitted light power density was measured with a calibrated Gentec power meter.

Figure 4B:
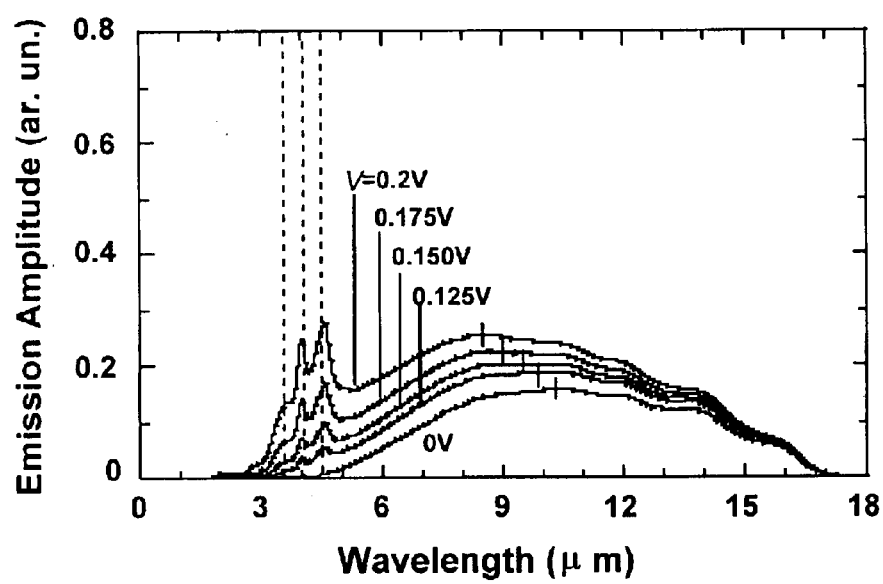
FIG. 4B shows the measured emission spectra of the tungsten photonic crystal at low bias voltages.

In FIG. 4B is shown the measured emission spectra of the photonic crystal at low bias voltages. With no voltage applied to the sample (i.e., V=0V), a broad emission spectrum was observed having a peak wavelength of λ~10 μm. This broad-band emission is due to the background radiation from the FTIR spectrometer chamber at room temperature. As the applied sample voltage is increased, the broad-band emission increases gradually in amplitude and shifts slightly to lower wavelengths. The small shift of the broad-band emission from a peak wavelength of λ~10 to ~8 μm suggests a slight sample heating from T=300 to about 375° K as the bias voltage is increased to 0.2V. This incremental increase in the broad-band emission is believed to originate from the sample's surface that experiences little photonic lattice effect. In addition, three sharp emission peaks appear at 3.5, 4, and 4.5 μm, corresponding to the location of the enhanced absorption peaks in FIG. 4A. The three narrow-band emission peaks increase strongly in amplitude as the bias voltage is increased to 0.2 volts, but do not display a wavelength shift.

The broad-band emission from the sample surface can be reduced with a composite photonic crystal structure, wherein the surface layer or layers of the composite photonic crystal comprises a different photonic crystal structure or material than the underlying bulk photonic crystal material. For example, the surface layer(s) can comprise a material having a lower intrinsic absorption than the bulk photonic crystal material. The photonic crystal surface layer(s) enables the optical emission from the underlying photonic crystal emitter material to escape from the composite structure with a lower surface absorption loss. For example, the composite photonic crystal can be a multi-layer tungsten photonic crystal surrounded by a two-layer gold photonic crystal. The gold surface layers can be a pure-gold photonic crystal or can the tungsten photonic crystal coated with a thin film of gold (i.e., with coating thickness greater than the skin depth of gold)

Figure 7:
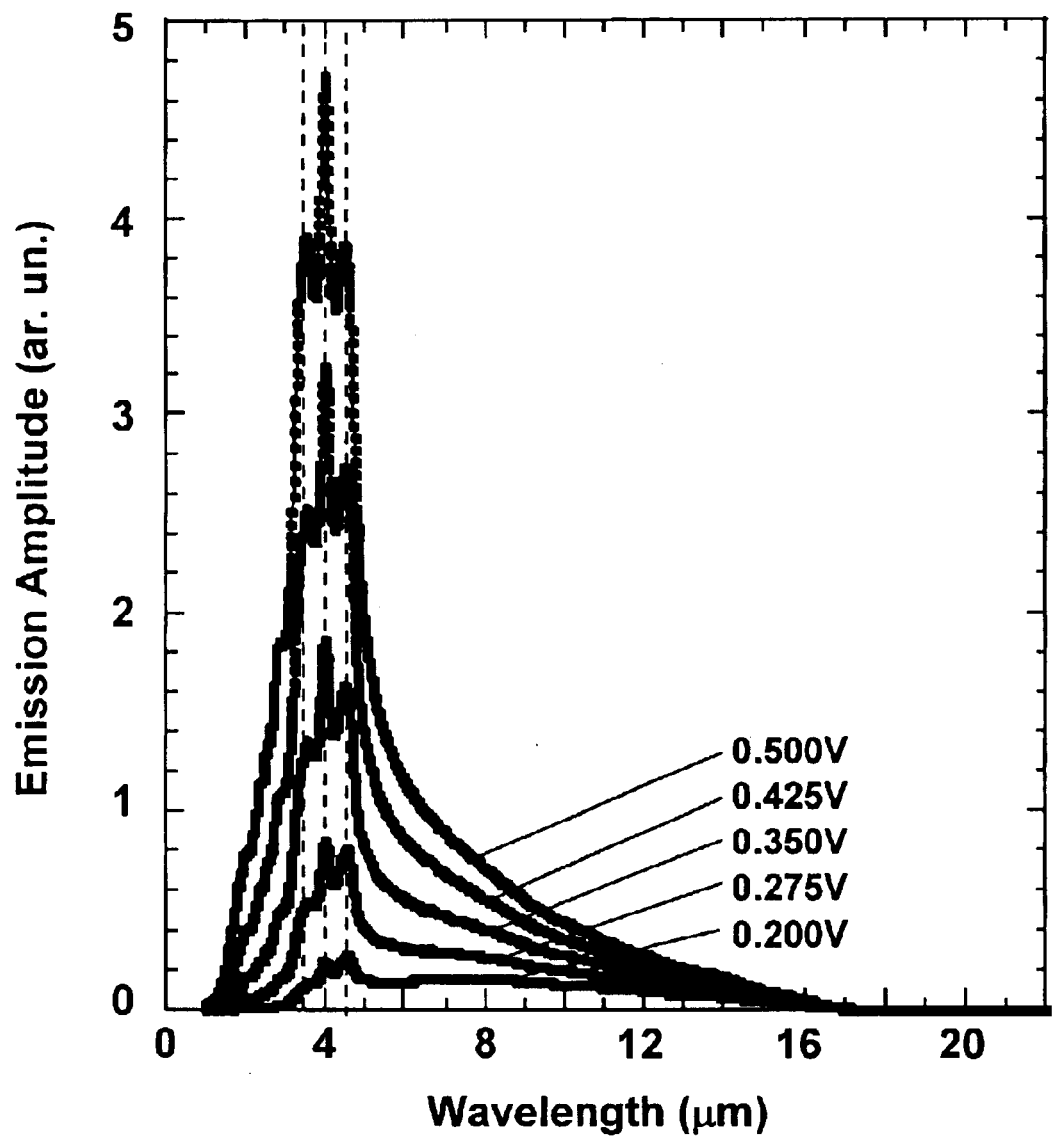
FIG. 7 shows emission spectra of the electrically heated tungsten photonic crystal thin film for various bias voltages.

In FIG. 7 is shown the evolution of the emission peaks, with the FTIR chamber background (i.e., the broad-band emission at V=0V) subtracted from the data. The narrow-band emission peaks become the dominant emission as the bias voltage is further increased from V=0.2 to 0.6 volts, corresponding to an increase in the electrical input power from 85 to 485 mW. The voltage dependent behavior of the narrow-band emission peaks indicates the conversion of input thermal excitation energy into a short-wavelength, band-edge light emission.

Figure 8:
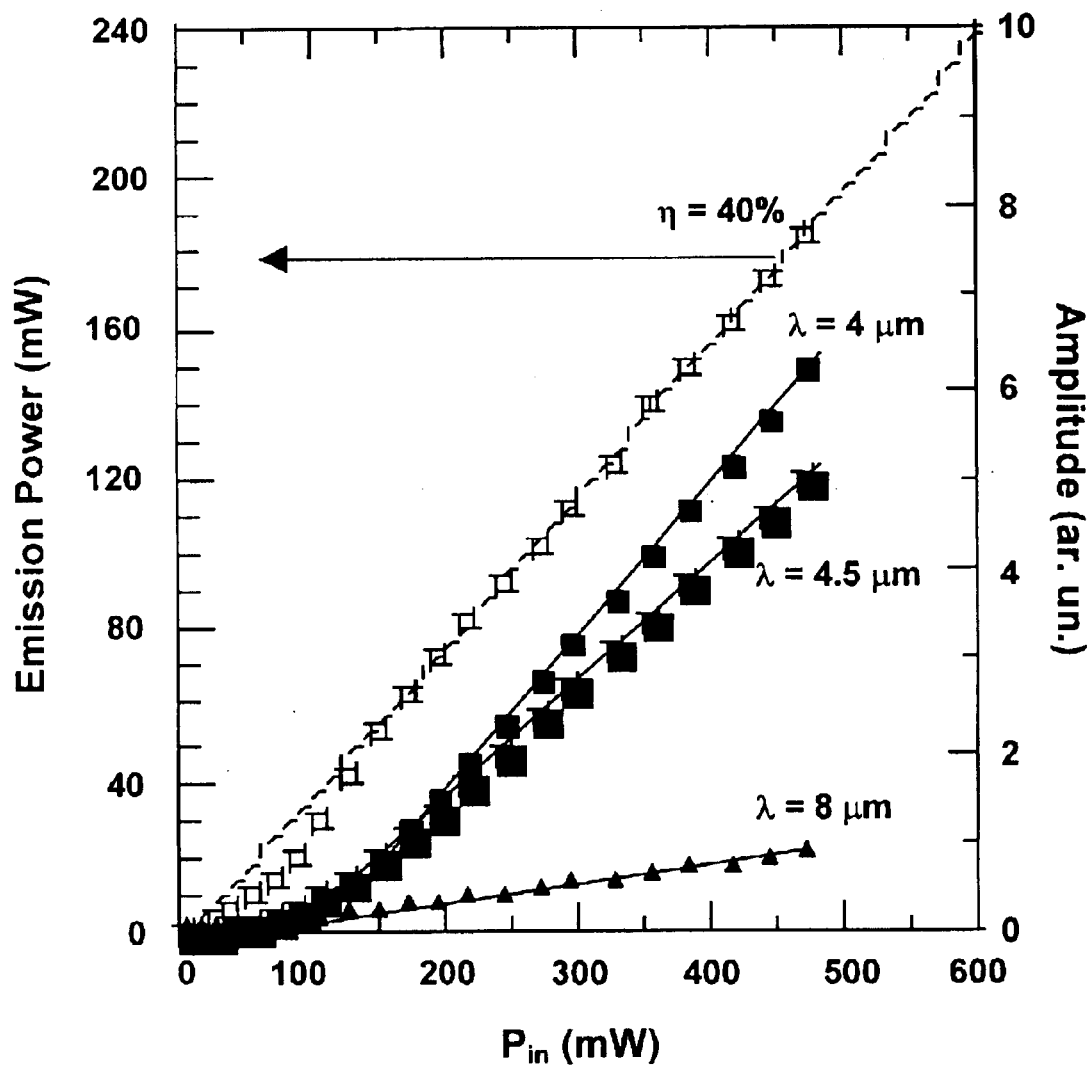
FIG. 8 shows a plot of the emission peak amplitudes for the band-edge and broad-band emission peaks of the tungsten photonic crystal as a function of input electrical power.

In FIG. 8 is shown the amplitude of the band-edge emission peaks at 4 and 4.5 μm (solid squares) and the broad-band emission peak at 8 μm (solid triangles) as a function of the input power. At low power, the peak amplitudes for the band-edge and broad-band emission peaks are comparable. However, as the input power is increased, the amount of power radiated in the band-edge emission peaks increases much faster than the longer wavelength, broadband emission. Also shown in FIG. 8 is the total radiated power of the emission from the top side of the sample (open squares). At higher input powers (i.e., higher temperatures), the observed radiated power increases linearly with and is about 40% of the input power. Assuming equal emission from both sides of the sample, the maximum radiated power from one side of the sample (i.e., into a 2π solid collection angle) is 50%. The 10% radiation loss is attributed primarily to thermal conduction from the sample to mounting fixture, since the measured conversion efficiency decreased as thermal conduction to the sample holder was increased. Therefore, this thermal loss can be minimized by thermally isolating the sample from its surroundings.

The efficient narrow-band emission can be explained as enhanced light emission from photonic band-edge states. The spectral energy density of an equilibrium radiator is given by $$u(\omega)=E(\omega)D(\omega)F(\omega,T) \tag{1}$$

where $E(\omega)=\hbar\omega$ is the photon energy, $D(\omega)$ is the density-of-states, and $F(\omega,T)=1/[\exp(\hbar\omega/k_bT)-1]$ is the Bose-Einstein distribution formula. In the low temperature limit (i.e., $\hbar\omega/k_bT=14400/\lambda T(\mu m-K)>>1$), Eq. (1) reduces to $$u(\omega)=E(\omega)D(\omega)\exp-(14400/\lambda T) \tag{2}$$

In free space, $D_o(\omega)=\omega^2/\pi^2c^3$, and Eq. (1) provides the spectral energy density for a blackbody radiator $$u(\omega)=(\hbar\omega^3/\pi^2c^3)/[\exp(\hbar\omega/k_bT)-1] \tag{3}$$

The theoretical emission power density for a blackbody radiator is given by $$M_e(\lambda,T)=(2\pi\hbar c^2/\lambda^5)/[\exp(\hbar\omega/k_bT)-1] \tag{4}$$

In these formulas, the only temperature-dependent term is the distribution function, $F(\omega,T)$, which is also the mean photon-occupation number, $<N_\omega>$.

Figure 9A:
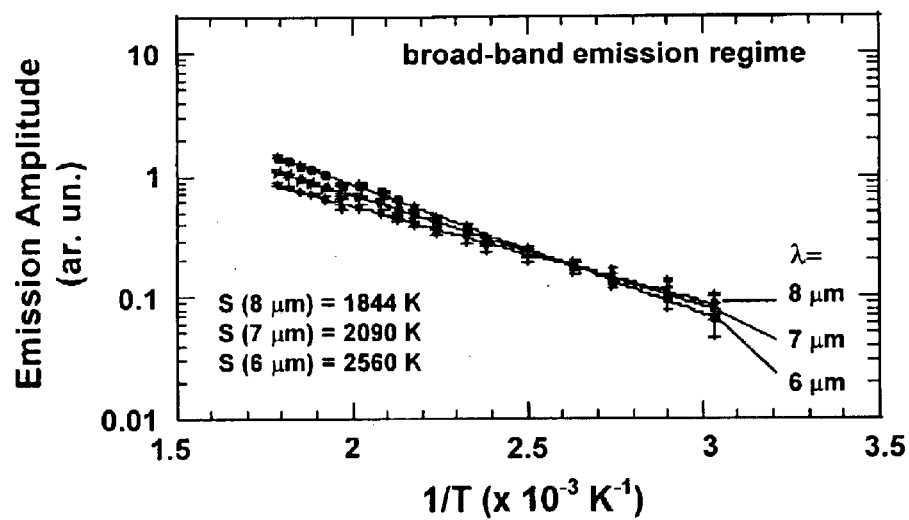
FIG. 9A shows the peak amplitudes for the broad-band emission peaks.

In FIG. 9A is shown a semi-logarithmic plot of the emission peak amplitude as a function of the inverse temperature for the broad-band emission at 6, 7, and 8 μm wavelengths. The temperature of the heated sample was determined from the temperature dependence of tungsten's resistivity, ρ(T). The low temperature spectral energy density formula, Eq. (2), is valid in the temperature range studied (i.e., 300 to 600° K). For the broad-band emission peak at λ=8 μm, the slope of the amplitude versus inverse temperature straight line on this semi-logarithm plot is $S_{exp}(\lambda=8 \mu m)=1844$ K. The slope of the broad-band emission peak line is comparable to the theoretical blackbody value of $S_{th}(\lambda=8 \mu m)=14400/\lambda=1800$ K, indicating that this broad-band emission is from a blackbody radiator in thermal equilibrium.

Figure 9B:
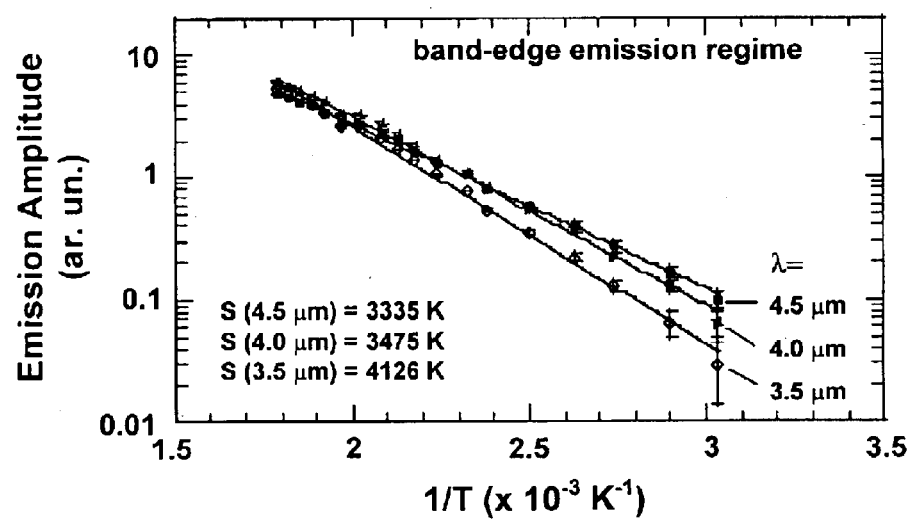
FIG. 9B shows the peak amplitudes for the band-edge emission peaks.

Also shown in FIG. 9B is a semi-logarithmic plot of the emission amplitude as a function of the inverse temperature for the band-edge emission peaks at 3.5, 4, and 4.5 μm wavelengths. The deduced semi-logarithm slopes are $S_{exp}(\lambda=3.5 \mu m)=4126$ K to $S_{exp}(\lambda=4.5 \mu m)=3335$ K. From the exponential dependence of the narrow-band emission on temperature, the band-edge emission peaks are also seen to follow Bose-Einstein statistics. This exponential dependence indicates equilibrium emission from the band-edge photonic states. The equilibrium behavior of the band-edge emission peaks and their pinning to the enhanced band-edge absorption peaks indicates that the enhanced spectral energy of the narrow-band emission peaks is due to an enhanced photonic density-of-states (i.e., $D(\omega)>D_o(\omega)$) at the photonic band edge.

Figure 10:
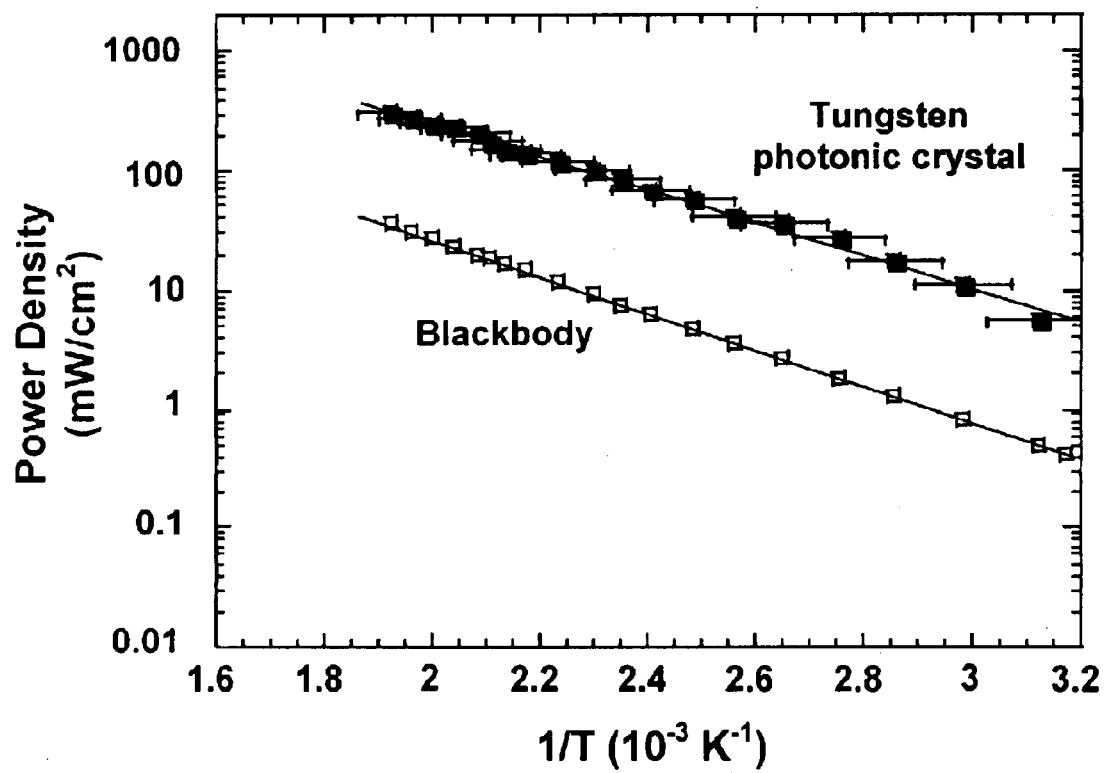
FIG. 10 shows a plot of the measured power density of the band-edge emission peaks for the tungsten photonic crystal compared to a theoretical blackbody radiator from $\Delta\lambda=3.5$–$4.5$ $\mu$m.

In FIG. 10 is shown a plot of the measured emission power density for the band-edge emission peaks of the tungsten photonic crystal compared to a theoretical blackbody radiator, given by Eq. (4), as a function of the inverse temperature for the wavelength range of Δλ=3.5–4.5 μm. The emission power density of the emission peaks increases in an exponential-like fashion as the temperature is increased. The measured emission power density of the band-edge emission peaks (solid squares) exceeds that of a blackbody radiator (open squares) by about an order of magnitude over the measured temperature range.

This enhanced light emission is due to the increased photon-matter interaction at the band edge. Simultaneously, the large and complete 3D photonic band gap inhibits thermal emission in the mid-infrared, effectively channeling the emission to the near-infrared band-edge emission. Therefore, very little thermal excitation energy is converted into the mid-infrared radiation and light emission occurs predominantly in narrow, band-edge emission at a shorter wavelength. This energy channeling enables direct conversion of input electrical power into narrow-band light emission.

Such narrow-band emission from a photonic crystal can provide an efficient light source for a wide variety of optical applications, including lighting, photonics, and sensors. The emission wavelength of the narrow-band emission can be easily varied by changing the lattice structure and material properties of the photonic crystal. Light sources with narrow-band emission in the visible can be obtained with photonic crystals having characteristic lattice dimensions on the order of 100 nm. Such minimum feature sizes are achievable with current state-of-the-art and projected silicon integrated technology processing tools and nanotechnology fabrication techniques. Furthermore, alternative materials having a complex dielectric constant, such as gold, silver, copper, nickel, titanium nitride, and silicon carbide, can be used instead of tungsten to obtain the enhanced light emission. Because the input power is efficiently channeled into the narrow-band light emission, the photonic crystal light source can be operated at lower temperatures compared to blackbody radiators. Therefore, thermal expansion mismatch between the photonic crystal dielectrics can be reduced, and materials other than air can be used as the second dielectric. Furthermore, multiple light sources can be monolithically fabricated on a single chip. This provides for the possibility of high quality lighting by phosphor excitation or color mixing of multiple narrow-band photonic crystal light sources. Furthermore, the color brightness of individual photonic crystal light sources can be independently biased, enabling continuously tunable color emission.

The present invention has been described as a light source comprising a photonic crystal exhibiting an enhanced photonic density-of-states over a band of frequencies and wherein at least one dielectric material of the photonic crystal has a complex dielectric constant. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A light source, comprising a photonic crystal having at least two dielectric materials that provide a periodic variation in the dielectric constant of the photonic crystal such that the photonic crystal exhibits an enhanced photonic density-of-states over a band of frequencies, and wherein at least one of the dielectric materials has a complex dielectric constant to provide enhanced light emission at the band of frequencies when the photonic crystal is heated.

2. The light source of claim 1, wherein the absolute value of the real part $|\varepsilon_r(\omega)|$ is greater than four times the imaginary part $\varepsilon_i(\omega)$ of the complex dielectric constant of the at least one of the dielectric materials at the band of frequencies.

3. The light source of claim 1, wherein the absolute value of the real part $|\varepsilon_r(\omega)|$ of the complex dielectric constant of the at least one of the dielectric materials is greater than 100 at the band of frequencies.

4. The light source of claim 1, wherein the absolute value of the real part $|\varepsilon_r(\omega)|$ of the complex dielectric constant of the at least one of the dielectric materials is greater than 10 at the band of frequencies.

5. The light source of claim 1, wherein the imaginary part $\varepsilon_i(\omega)$ of the complex dielectric constant of the at least one of the dielectric materials is greater than 5 at the band of frequencies.

6. The light source of claim 1, wherein the imaginary part $\varepsilon_i(\omega)$ of the complex dielectric constant of the at least one of the dielectric materials is greater than 1 at the band of frequencies.

7. The light source of claim 1, wherein the photonic crystal has a photonic band gap and the enhanced photonic density-of-states occurs within an allowed band of the photonic crystal.

8. The light source of claim 1, wherein the enhanced photonic density-of-states occurs at a photonic band edge.

9. The light source of claim 1, wherein the photonic crystal comprises a cavity defect providing the enhanced photonic density-of-states within a photonic band gap of the photonic crystal.

10. The light source of claim 9, wherein the cavity defect comprises an additive defect.

11. The light source of claim 9, wherein the cavity defect comprises a subtractive defect.

12. The light source of claim 9, wherein the cavity defect comprises replacing at least one of the dielectric materials with another dielectric material in a region of the photonic crystal.

13. The light source of claim 1, wherein the photonic crystal further comprises a surface photonic crystal that is different than the photonic crystal that underlies the surface photonic crystal.

14. The light source of claim 13, wherein the surface photonic crystal comprises at least one dielectric material having a complex dielectric constant having a lower imaginary part than the imaginary part of the at least one of the dielectric materials having a complex dielectric constant of the photonic crystal.

15. The light source of claim 13, wherein the surface photonic crystal has a thickness of less than one unit cell.

16. The light source of claim 1, wherein the photonic crystal is thermally isolated from its surroundings.

17. The light source of claim 16, wherein the thermal isolation comprises surrounding the photonic crystal with a vacuum or low-pressure, low conductivity gas.

18. The light source of claim 16, wherein the photonic crystal is mounted on a low-heat-conductivity, low-heat-capacity substrate.

19. The light source of claim 1, wherein the photonic crystal is heated resistively by the application of a bias voltage to the photonic crystal.

20. The light source of claim 1, wherein the photonic crystal is heated by a combustion heat supply, solar absorber, or radiation absorber.

21. The light source of claim 1, wherein one of the at least two dielectric materials comprises a gas.

22. The light source of claim 1, wherein the at least one of the dielectric materials having a complex dielectric constant comprises a metal.

23. The light source of claim 22, wherein the metal comprises tungsten, gold silver, copper, or nickel.

24. The light source of claim 1, wherein the at least one of the dielectric materials having a complex dielectric constant comprises titanium nitride or silicon carbide.

25. The light source of claim 1, wherein the periodic variation in the dielectric constant is less than 10 microns.

26. The light source of claim 1, wherein the periodic variation in the dielectric constant is less than 1 micron.

27. The light source of claim 1, wherein the photonic crystal is two-dimensional.

28. The light source of claim 1, wherein the photonic crystal is three-dimensional.

29. The light source of claim 1, further comprising at least one additional photonic crystal having at least two dielectric materials that provide a periodic variation in the dielectric constant of the at least one additional photonic crystal such that the at least one additional photonic crystal exhibits an enhanced photonic density-of-states over a different band of frequencies than the photonic crystal, and wherein at least one of the dielectric materials of the at least one additional photonic crystal has a complex dielectric constant to provide enhanced light emission at the different band of frequencies when the at least one additional photonic crystal is heated to provide color mixing with the enhanced light emission of the photonic crystal.

30. A method for producing light emission, comprising heating a photonic crystal having at least two dielectric materials that provide a periodic variation in the dielectric constant of the photonic crystal such that the photonic crystal exhibits an enhanced photonic density-of-states over a band of frequencies, and wherein at least one of the dielectric materials has a complex dielectric constant to provide enhanced light emission at the band of frequencies.

31. The method of claim 30, wherein the heating comprises resistive heating by application of a bias voltage to the photonic crystal.

32. The method of claim 30, wherein the heating comprises heating the photonic crystal with a combustion heat supply, solar absorber, or radiation absorber.

33. The method of claim 30, wherein the photonic crystal is thermally isolated from its surroundings.

34. The method of claim 33, wherein the thermal isolation comprises surrounding the photonic crystal with a vacuum or low pressure, low conductivity gas.

35. The method of claim 33, wherein the thermal isolation comprises mounting the photonic crystal on a low-heat-conductivity, low-heat-capacity substrate.

36. The method of claim 30, wherein the absolute value of the real part $|\epsilon_r(\omega)|$ is greater than four times the imaginary part $\epsilon_i(\omega)$ of the complex dielectric constant of the at least one of the dielectric materials at the band of frequencies.

37. The method of claim 30, wherein the absolute value of the real part $|\epsilon_r(\omega)|$ of the complex dielectric constant of the at least one of the dielectric materials is greater than 100 at the band of frequencies.

38. The method of claim 30, wherein the absolute value of the real part $|\epsilon_r(\omega)|$ of the complex dielectric constant of the at least one of the dielectric materials is greater than 10 at the band of frequencies.

39. The method of claim 30, wherein the imaginary part $\epsilon_i(\omega)$ of the complex dielectric constant of the at least one of the dielectric materials is greater than 5 at the band of frequencies.

40. The method of claim 30, wherein the imaginary part $\epsilon_i(\omega)$ of the complex dielectric constant of the at least one of the dielectric materials is greater than 1 at the band of frequencies.

41. The method of claim 30, wherein the photonic crystal has a photonic band gap and the enhanced photonic density-of-states occurs within an allowed band of the photonic crystal.

42. The method of claim 30, wherein the enhanced photonic density-of-states occurs at a photonic band edge.

43. The method of claim 30, wherein the photonic crystal comprises a cavity defect providing the enhanced photonic density-of-states within a photonic band gap of the photonic crystal.

44. The method of claim 43, wherein the cavity defect comprises an additive defect.

45. The method of claim 43, wherein the cavity defect comprises a subtractive defect.

46. The method of claim 43, wherein the cavity defect comprises replacing at least one of the dielectric materials with another dielectric material in a region of the photonic crystal.

47. The method of claim 30, wherein one of the at least two dielectric materials comprises a gas.

48. The method of claim 30, wherein the at least one of the dielectric materials having complex dielectric constant comprises a metal.

49. The method of claim 48, wherein the metal comprises tungsten, gold, silver, copper, or nickel.

50. The method of claim 30, wherein the periodic variation in the dielectric constant is less than 10 microns.

51. The method of claim 30, wherein the periodic variation in the dielectric constant is less than 1 micron.

52. The method of claim 30, wherein the photonic crystal is two-dimensional.

53. The method of claim 30, wherein the photonic crystal is three-dimensional.

54. The method of claim 29, further comprising heating at least one additional photonic crystal having at least two dielectric materials that provide a periodic variation in the dielectric constant of the at least one additional photonic crystal such that the at least one additional photonic crystal exhibits an enhanced photonic density-of-states over a different band of frequencies than the photonic crystal, and wherein at least one of the dielectric materials of the at least one additional photonic crystal has a complex dielectric constant to provide enhanced light emission at the different band of frequencies to provide color mixing with the enhanced light emission of the photonic crystal.

* * * * *